H. C. GAMMETER.
RIBBON FEEDING MECHANISM.
APPLICATION FILED MAR. 2, 1908.

997,615.

Patented July 11, 1911.

4 SHEETS—SHEET 1.

WITNESSES:
Arthur S. Remsberg.
Brennan B. West.

INVENTOR,
Harry C. Gammeter.
BY Baker, Foulk & Hull
ATTYS.

H. C. GAMMETER.
RIBBON FEEDING MECHANISM.
APPLICATION FILED MAR. 2, 1908.
997,615.
Patented July 11, 1911.
4 SHEETS—SHEET 2.
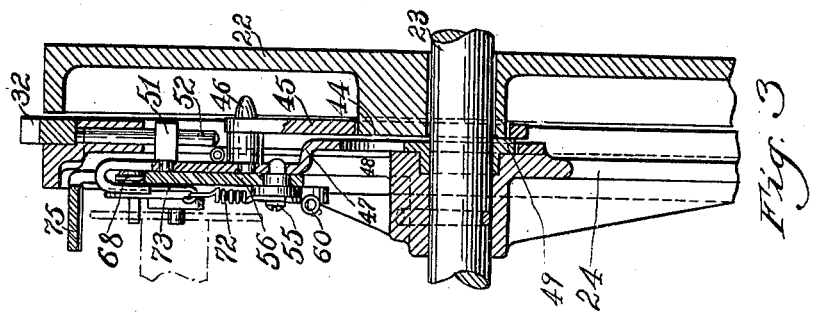
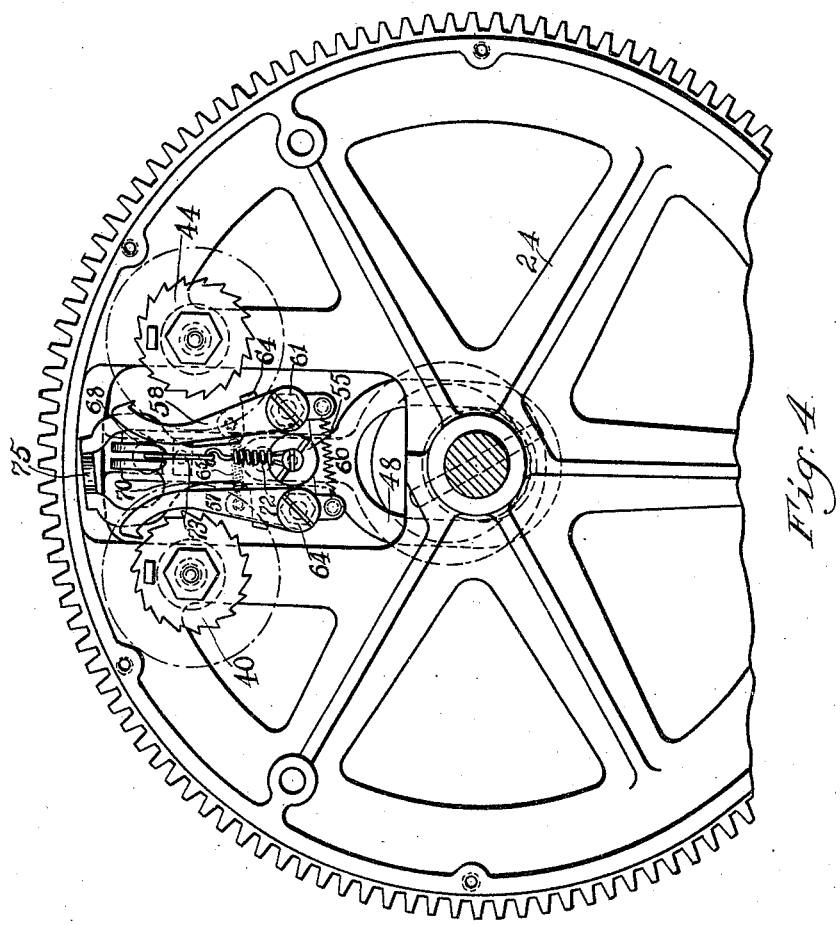
WITNESSES:
Arthur S. Reinberg.
Brennan B. West.
INVENTOR,
Harry C. Gammeter,
BY
Bates, Fouts & Hull
ATTYS.

H. C. GAMMETER.
RIBBON FEEDING MECHANISM.
APPLICATION FILED MAR. 2, 1908.
997,615.
Patented July 11, 1911.
4 SHEETS—SHEET 3.
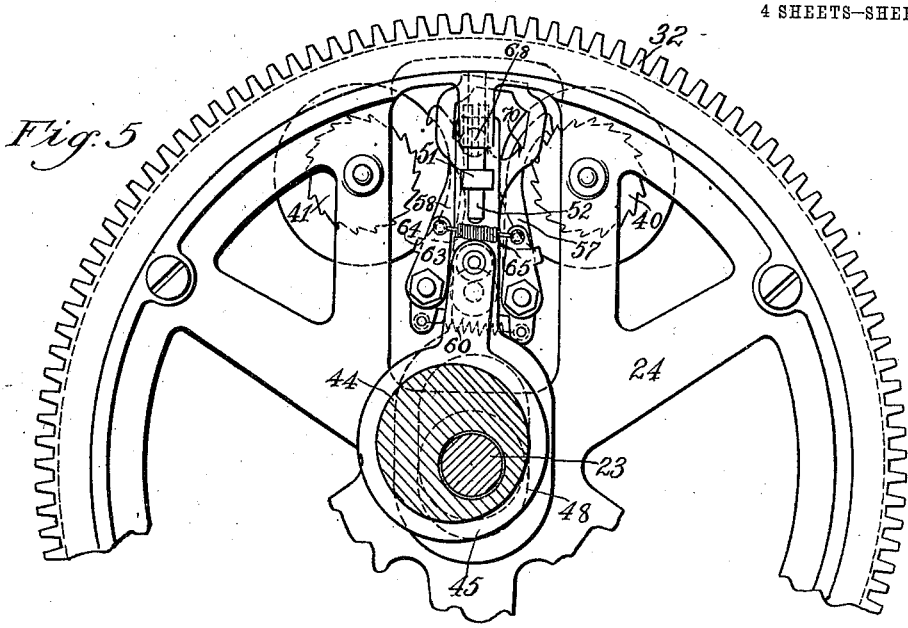
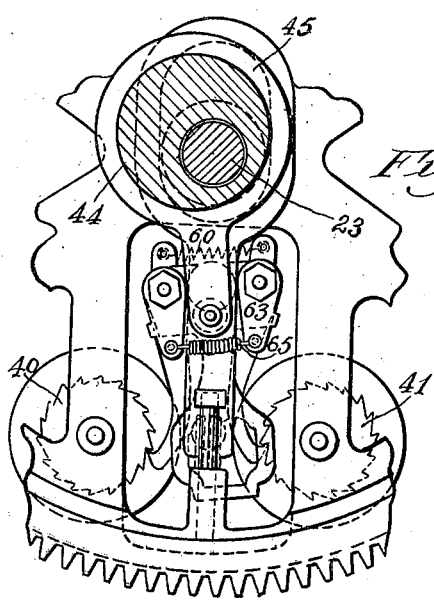
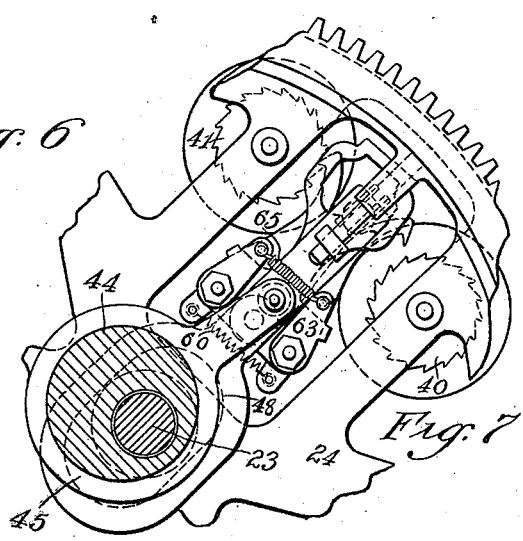
WITNESSES:
Arthur S. Remberg
Norman B. West
INVENTOR,
Harry C. Gammeter
BY Bates Fouts & Hull
ATTYS.

H. C. GAMMETER.
RIBBON FEEDING MECHANISM.
APPLICATION FILED MAR. 2, 1908.

997,615.

Patented July 11, 1911.

4 SHEETS—SHEET 4.

WITNESSES:
Arthur S. Remberg.
Brennan B. West.

INVENTOR,
Harry C. Gammeter
By Bates, Foulk Hull
Attorneys.

UNITED STATES PATENT OFFICE.

HARRY C. GAMMETER, OF COLLINWOOD, OHIO, ASSIGNOR TO THE AMERICAN MULTI-GRAPH COMPANY, OF CLEVELAND, OHIO, A CORPORATION OF OHIO.

RIBBON-FEEDING MECHANISM.

997,615.                    Specification of Letters Patent.       Patented July 11, 1911.

Original application filed December 16, 1907, Serial No. 406,678. Divided and this application filed March 2, 1908. Serial No. 418,657.

*To all whom it may concern:*

Be it known that I, HARRY C. GAMMETER, a citizen of the United States, residing at Collinwood, in the county of Cuyahoga and State of Ohio, have invented a certain new and useful Improvement in Ribbon-Feeding Mechanism, of which the following is a full, clear, and exact description, reference being had to the accompanying drawings.

This invention relates to mechanism for feeding ribbons such as are used in various machines, for example, those where printing is effected through an inked ribbon.

The primary object of the invention is to provide mechanism for automatically reversing the direction of the feed.

My mechanism is shown herein as embodied in a printing machine having a rotary drum carrying two spools on which the ends of the ribbon are wound. The feeding mechanism is carried partly by such drum and partly by a stationary member, so that the rotation of the drum automatically causes the feeding of the ribbon, and when either spool becomes empty the mechanism is automatically shifted to drive the other spool.

Though I have shown the invention herein as embodied in a rotary printing device, the present patent is concerned with the ribbon feeding and reversing mechanism broadly and irrespective of its combination with a printing mechanism. The combination of my invention with printing mechanism, and more particularly with rotary printing mechanism, or printing mechanism adapted to carry a page form of type, is covered in my application No. 406,678, filed December 16, 1907, of which this is a division.

Figure 1:
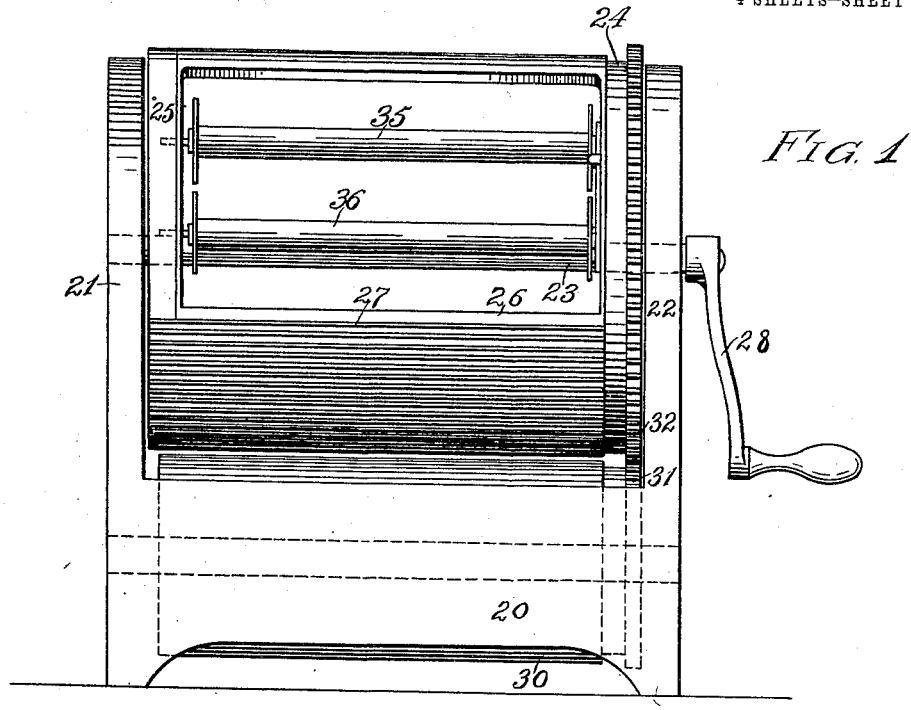
Figure 2:
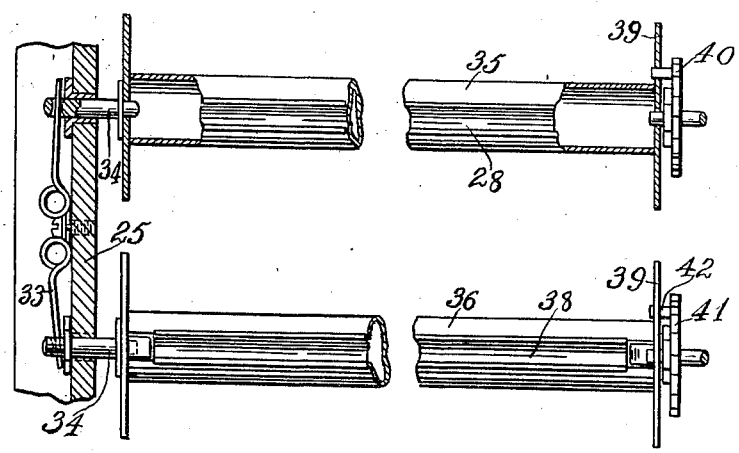
Figure 8:
Figure 11:
Figure 9:
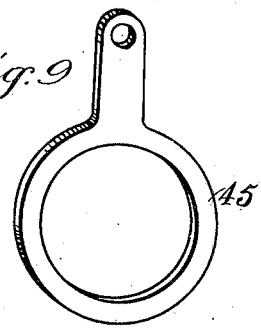
Figure 12:
Figure 13:
Figure 10:
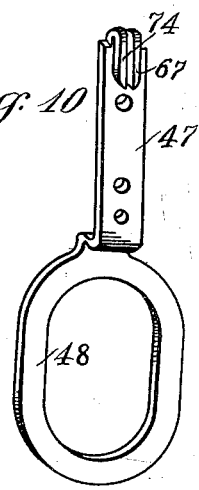
Figure 14:
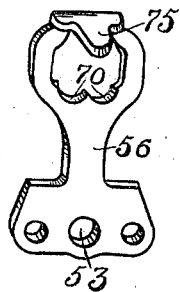

In the drawings, Figure 1 is a front elevation of a rotary printing machine which may embody my feeding mechanism; Fig. 2 is an enlarged view of the ribbon spools with their supports and holding springs; Fig. 3 is a vertical section through the right hand frame member of the machine and the adjacent end of the drum; Fig. 4 is an elevation of the right hand end member of the drum which carries the feeding mechanism, this view being taken looking from the interior of the drum; Fig. 5 is an outside end view of the drum sectioned through the stationary eccentric on the frame member; Figs. 6 and 7 are portions of similar views in different positions; the remaining figures are perspectives of different members of the feeding mechanism; namely; Fig. 8, one of the ratchet wheels; Fig. 9, the eccentric strap; Fig. 10, the bar reciprocated by the eccentric strap; Fig. 11, the detent roller for holding the pawl supporting the plate in either extreme position; Fig. 12, one of the arms limiting the outward movement of the pawls; Fig. 13, one of the ratchet driving pawls; Fig. 14, the plate which carries the driving pawls.

Referring to the parts by reference numerals, 20 represents the frame of the machine which is shown as having a pair of vertical end plates 21 and 22. Mounted in these plates is the shaft 23 which carries the printing drum, the drum having spider-like end members 24 and 25 and having a partial cylindrical surface 26 on which are longitudinal rails 27 forming undercut channels adapted to carry rows of individual grooved type. A crank 28 furnishes means for rotating the drum. Beneath the drum is a rotary platen 30 connected with the drum by gears 31 and 32.

35 and 36 represent the ribbon spools which occupy a recess in the drum. The ends of the ribbon are secured to these spools, for example, by means of trough-shaped clamps 38 springing into slots in the spools. The ribbon passes from one spool around the surface of the drum and over the type to the other spool. Accordingly, if the drum be rotated by the crank and paper be fed to the contacting line of the drum and platen, the same will be printed by successive lines of type through the ribbon. The type may well have a face similar to typewriter type, in which case the rolling contact through the ribbon produces an almost exact imitation of typewritten work, the irregularities resulting from the type being somewhat loosely held on the drum heightening this effect.

To present a fresh face to the type for successive impressions, I provide mechanism to gradually rotate either ribbon spool. As shown, this mechanism includes a pair of ratchet wheels 40 and 41 adapted to be connected with the respective spools by lugs 42 engaging openings in the spool heads 39. Fig. 8 illustrates such ratchet wheel 40. The spools are pressed toward the ratchets by a spring 33 (Fig. 2) forcing inward the pins 34 on which the spools bear at that end. A stationary eccentric 44, formed as a boss on the inner side of the frame member 22, operates intermediate mechanism carried by the end member 24 of the drum and traveling around with the drum and reciprocated in and out radially by such eccentric to operate the corresponding spool. I will now proceed to describe the mechanism which effects the ribbon drive and allows this automatic reversal.

45 indicates an eccentric strap surrounding the stationary eccentric 44. At its outer end this strap extends around a pin 46 projecting from a bar 47, the lower end of which yokes around the shaft 23 having a parallel sided elongated opening 48 which engages a guiding bushing 49 on the shaft. Fig. 9 shows the eccentric strap and Fig. 10 the bar. Near its outer end this bar 47 carries a block 51 slidably engaging a radial pin 52 carried by the end member 24 of the drum, the result being that this bar is reciprocated radially as the drum rotates.

Pivoted to the bar 47 by the pin 55 is a plate 56 in the form shown in Fig. 14, the pin passing through an opening 53 in the plate. Pivoted to this plate on the opposite sides of its pivot are two pawls 57 and 58 in the form shown in Fig. 13. The lower ends of these pawls are given a tendency to move toward each other by a spring 60 connected to such lower ends. Mounted on the pivot pins 61 of these pawls are short rock arms 63, of the form shown in Fig. 12, each rock arm having a lug adapted to engage the outer side of the respective pawl 57 or 58. These two rock arms are constrained toward each other by a spring 65 which is materially stronger than the spring 60. The upper end of the bar 47 is bent parallel therewith, after the manner of an inverted U, as shown at 67 in Fig. 10. Between this bent over portion and the body of the bar is a roller 68 (shown detached in Fig. 11) which is adapted to lie in either of two recesses 70 in the plate 56, the roller being constrained inwardly radially by means of a spring 72, anchored on the pin 55 and connected at its outer end with a hook 73 passing through a slot 74 in the bent over end 67 of the bar 47 and passing into a central opening in the roller 68.

The operation of the above described construction is as follows: When the plate 56 is in either extreme position, it is normally held by the roller 68 and the spring 72, and accordingly reciprocates as one with the bar 47, this reciprocation causing the corresponding pawl 57 or 58 to engage the teeth of the corresponding ratchet and feed the same when the bar moves inward. The spring 65 acting on the rock arms 63 prevents the pawls normally passing outwardly beyond the limits provided by the lugs 64, so that the unengaged pawl is normally idle. The engaged pawl may swing inwardly, as the convexity of the ratchet moves it away from the lug, the spring 60 allowing this result. As shown in Figs. 4 and 5, the pawl 57 is in position to engage the ratchet 40. If, however, the roller 68 were in engagement with the other notch 70, the member 56 would be positioned so that the pawl 58 would be in position to engage the ratchet 41, the other pawl being idle. A projecting lip 75 at the upper end of the plate 56 furnishes a handle by which it may be shifted by the operator's fingers into either position to set the direction of the drive as desired. The peculiar advantage, however, of my driving mechanism is its automatically reversing feature. This operates as follows: When either ribbon spool becomes empty, as, for example, the spool 35 connected with the ratchet 40, the pawl operating therewith, for example 57, is retarded on its inward stroke by reason of the stretched ribbon preventing the ratchet rotating. This retardation anchors, as it were, the pivot 61 of the pawl so that on the continued movement of the bar and plate 56, this plate swings about such pin as a pivot and thereby passes over to its other extreme position, the roller 68 being forced outwardly slightly and passing into the other depression 70. The described movement, however, cannot take place until the driving pawl, as 57, has a firm hold on its ratchet and is held thereto by the back lash of the ratchet teeth and the pawl nose. Accordingly, when the plate 56 swings over to the other extreme position, the engaged pawl, as 57, does not immediately swing with it but retains its engagement with the former ratchet wheel, the spring 65 expanding to allow such movement. The other pawl, as 58, comes into engagement with its wheel, and, accordingly, the driving mechanism is connected with both wheels, and the rest of the inward movement winds in both spools and tightens the ribbon. This tightening movement is only for a slight distance and is sufficient to take up any slack in the ribbon, so that the new ratchet is in position to immediately wind the ribbon. Now, when the mechanism moves outwardly, the former pawl, as 57, releases its hold on the ratchet, and then, by reason of the contraction of the spring 65, swings backwardly into idle position, wherefore the continued movement operates the newly engaged ratchet only.

It is to be understood that the effective driving movement of the mechanism takes place while the recess in which the spools are mounted is moving past the platen. The eccentric 44 extends in such direction that while the type portion of the drum is moving past the platen, the driving mechanism is either moving outwardly or moving inwardly but beyond the ratchets. The outer movement occupies half the rotation and the idle inward movement substantially a quarter of the rotation so that the effective inward movement, which is the last half of the total inward movement, is substantially for a quarter rotation.

Figs. 5, 6 and 7 illustrate the position of the drum when the automatic shifting may take place, these views being taken looking at the end of the drum from the right hand with the parts traveling in the contraclockwise direction. It will be seen that in Fig. 5, the driving mechanism is moving outwardly, then after it leaves the upper left hand portion of the circle it begins to move inwardly, the actual engagement taking place as the mechanism is leaving the lower left hand portion of the circle. If on such engagement one of the spools is empty, the driving mechanism will come into the position shown in Fig. 6, where the pawls engage both ratchets and where the ribbon is pulled from both directions. This pull will continue until the driving mechanism has entered the lower right hand portion of the circle. Then, as the mechanism is moving upwardly, it moves outwardly so that, as it comes into the position shown in Fig. 7 in the upper right hand portion of the circle, the former pawl releases its hold on the former ratchet, and the mechanism is thus completely reversed, ready for successive subsequent feeding on the new ratchet.

I claim:

1. In a ribbon feeding mechanism, the combination of a pair of wheels, both being drivers for feeding the ribbon, a pair of pawls, each adapted to engage its respective wheel, and means for causing said pawls to be in engagement with both wheels simultaneously.

2. In a ribbon feeding mechanism, the combination of a pair of driving wheels, a pair of pawls for driving the same, and means for automatically changing the presentation of the driving mechanism to present either pawl to the corresponding wheel and during such change causing the pawls to engage both wheels consequent upon the retardation of one of the wheels.

3. In a ribbon feeding mechanism, the combination of a pair of spools, a pair of independently pivoted driving pawls, and a pivoted member on which said pawls are mounted on opposite sides of its pivot, said parts being so formed that the retardation of either pawl may shift the member to bring the other pawl into engagement with the other wheel.

4. In a ribbon feeding mechanism, the combination of a pair of spools, a pair of independently pivoted driving pawls, a pivoted member on which said pawls are mounted on opposite sides of its pivot, and a spring detent for normally holding said member in either extreme position, said parts being so formed that the retardation of either pawl may shift the member to bring the other pawl into engagement with the other wheel.

5. In a ribbon feeding mechanism, the combination of a pair of wheels, a pair of pawls adapted to engage their respective wheels, a pivoted member carrying said pawls and adapted to be held with either pawl in position to coöperate with its corresponding wheel, the stoppage of either pawl causing the member to shift on its pivot to bring the other pawl into engagement with the other wheel.

6. In a ribbon feeding mechanism, the combination of a pair of driving wheels, a pair of pawls adapted to engage their respective wheels, and a movable member carrying said pawls and adapted to be held with either pawl in position to coöperate with its corresponding wheel, said member being formed to allow both pawls to simultaneously engage with both wheels.

7. In a ribbon feeding mechanism, the combination of a pair of wheels, a reciprocating member, a pivoted member carried thereby, a pair of pawls pivotally mounted on said pivoted member on opposite sides of its pivot, said pawls being adapted to engage said wheels respectively and each adapted to form an anchorage to shift said pivoted member to present the other pawl to the other wheel.

8. In a ribbon feeding mechanism, the combination of a pair of wheels, a reciprocating member, a plate pivoted thereto, and a pair of pawls pivotally mounted on said plate, said pawls being adapted to engage said wheels respectively and each adapted to form an anchorage to shift said pivoted member to present the other pawl to the other wheel.

9. In a ribbon feeding mechanism, the combination of a pair of wheels, a reciprocating member, a pivoted member carried thereby, a pair of pawls pivotally mounted on said pivoted member, said pawls being adapted to engage said wheels respectively, and spring mechanism adapted to hold the idle pawl in idle position but allowing it to be moved against the action of the spring to engage the corresponding wheel.

10. The combination of a pair of wheels, a pair of pawls adapted to engage the same respectively, means for giving said pawls a tendency to move toward their respective wheels, movable stops for limiting such movement, and yielding means for constraining such stops.

11. The combination of a pair of ratchet wheels, a pair of pivoted pawls adapted to engage the same respectively, a spring connecting said pawls and giving them a tendency to move outwardly, stops limiting the outward movement, and a spring holding said stops in normal position.

12. The combination of a pair of ratchet wheels, a reciprocating member, a pivoted member thereon, a pair of pawls pivotally mounted on said pivoted member and adapted to engage the respective ratchet wheels, means tending to move said pawls outwardly, and means for elastically limiting the outward movement.

13. The combination of a pair of ratchet wheels, a reciprocating member, a pivoted member thereon, a pair of pawls pivotally mounted on said pivoted member on opposite sides of its pivot and adapted to engage the respective ratchet wheels, a spring tending to move said pawls outwardly, and spring means for limiting such outward movement.

14. In a ribbon feeding mechanism, the combination of a reciprocating member, a pivoted member mounted thereon, a pair of pawls pivotally carried by said pivoted member, means tending to force said pawls outwardly, and spring controlled restraining means for the pawls.

15. The combination of a pair of ratchet wheels, a reciprocating member, a pivoted member thereon, a pair of pawls pivotally mounted on said pivoted member and adapted to engage the respective ratchet wheels, and a spring tending to move said pawls outwardly, and a pair of rock arms pivotally carried also by said pivoted member, said rock arms having lugs providing stops for the pawls, and a spring connecting said rock arms, said spring being stronger than the spring connecting the pawls.

16. In a ribbon feeding mechanism, the combination of a reciprocating member, a pivoted member mounted thereon, a roller guided by one of said members and adapted to occupy either of two recesses in the other member, a spring for constraining said roller, and a pair of pawls pivotally carried by said pivoted member.

17. In a ribbon feeding mechanism, the combination of a pair of ratchet wheels, a reciprocating member, a pivoted member mounted thereon, a roller guided by the reciprocating member adapted to occupy either of two recesses in the pivoted member, a spring for constraining said roller, and a pair of pawls pivotally carried by said pivoted member and adapted to engage said wheels respectively.

18. In a ribbon feeding mechanism, the combination of a reciprocating member, a pivoted member mounted thereon, a roller guided by the reciprocating member adapted to occupy either of two recesses in the pivoted member, a spring for constraining said roller, and a pair of pawls pivotally carried by said pivoted member, means tending to force said pawls outwardly, and spring controlled restraining means for the pawls.

19. The combination of a reciprocating member, a member pivoted thereto, a pair of pawls pivoted to the pivoted member, means for swinging said pawls on their pivots, and elastic means for limiting such movement of the pawls.

20. The combination of a pivoted member, a pair of pawls pivoted to the pivoted member, spring means for swinging said pawls on their pivots, and elastic means for limiting such movement of the pawls.

21. The combination, in a ribbon feeding mechanism, of a pair of pivoted pawls, spring means for swinging said pawls on their pivots, and elastically held means for limiting such movement of the pawls.

In testimony whereof, I hereunto affix my signature in the presence of two witnesses.

HARRY C. GAMMETER.

Witnesses:
M. A. BRADLEY,
T. F. NEWMAN.

---

Copies of this patent may be obtained for five cents each, by addressing the "Commissioner of Patents, Washington, D. C."